Figure 1:
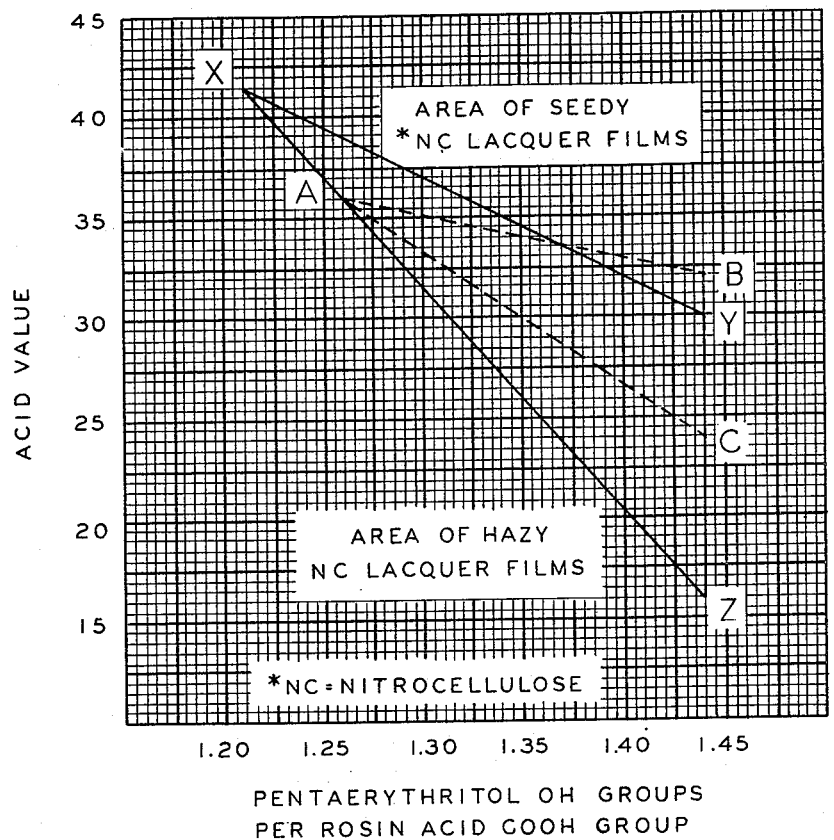

Patented Jan. 2, 1951

2,536,661

UNITED STATES PATENT OFFICE 2,536,661

NITROCELLULOSE COMPATIBLE PENTAERYTHRITOL ESTERS

Alfred E. Rheineck, Wilmington, Del., assignor to Hercules Powder Company, Wilmington, Del., a corporation of Delaware Application May 13, 1950, Serial No. 161,859

13 Claims. (Cl. 260—104)

This invention relates to esters of a pentaerythritol and a rosin acid and methods for producing the same.

It is known to produce esters of pentaerythritol and a resin acid. Such esters are characterized by great hardness, clarity and high melting point, see U. S. 1,820,265 to Leavitt N. Bent and Alan C. Johnston. In some respects these esters constitute an improvement over esters derived from glycerol and a resin acid. It is also known to use such esters in the preparation of oleoresinous varnishes and in lacquers. However, despite the fact that the pentaerythritol esters contribute desirable properties to such compositions, it is well known that the pentaerythritol esters of resin have an objectionable characteristic when used in nitrocellulose lacquer formulations. The coatings or films resulting from such compositions evidence incompatibility of the ingredients which is variously described as seediness, graininess or haziness.

Seediness or graininess can be observed by viewing in the direction of a source of light a dried film held horizontally at near eye level. The phenomenon is manifested as small specks spread uniformly throughout the film. Haziness may be observed by viewing the film against a dark background and is manifested as a smoky or milky condition.

In my application S. N. 161,857, filed of even date herewith, there are described novel resinous esters of a pentaerythritol and a resin acid material which esters are truly compatible with nitrocellulose and which may be used in nitrocellulose lacquer formulations to provide perfectly clear lacquer films. Such esters are prepared by employing in the esterification reaction an excess of pentaerythritol over and above that theoretically required for complete esterification of the rosin acid material employed. More specifically, such an amount of pentaerythritol is employed as to provide from 1.26 to 1.44 hydroxyl groups for each rosin acid carboxyl group. The hydroxyl excess is then correlated with the acid value of the ester, it having been found that for any particular hydroxyl excess there exists a definite range of acid values wherein truly nitrocellulose compatible esters are obtained. This range may be referred to as the acid value compatibility range. Furthermore, the area which defines the acid value ranges which obtain for a series of hydroxyl excesses may be regarded as the acid value compatibility band, see area ABC of Figure 1.

It has now been found that certain substances, when present with the reactants during the resin-forming reaction, have the effect of extending the acid value compatibility range or broadening the acid value compatibility band, as the case may be. These substances are referred to herein as compatibility catalysts. More specifically it has been found that the substances which are effective in this manner are compounds of metals of Groups IA, IIA and IIB of the periodic table. Only those compounds of metals having atomic weights below 140 appear to be effective. However, outside the aforementioned groups lead and cobalt compounds appear to be effective catalysts. To be effective the compounds employed must be of such a nature that aqueous solutions thereof are basic or alkaline. For example, calcium acetate is an effective compatibility catalyst in accordance with this invention. Referring to Figure 1, when 1.44 pentaerythritol hydroxyl groups per rosin acid carboxyl group are employed, the use of calcium acetate as catalyst changes the acid value compatibility range from 24–32 to 16–30. This constitutes a substantial improvement both in that the range of compatibility is much broader and hence easier to hit in commercial production and in that nitrocellulose compatible resins can be obtained at lower acid values.

Although the compatibility catalysts broadly defined above all have the effect of broadening the acid value compatibility band, they do not all give precisely the same compatibility band. Thus, calcium compounds will not necessarily give precisely the same compatibility band as will sodium compounds. However, either type of catalyst will provide a broadened compatibility band as compared with the band which obtains in the case of no catalyst. Furthermore, the amount of catalyst has an effect on the shape of the compatibility band. Taking all these factors into consideration, the lowest acid value at which nitrocellulose compatible resins have been obtained using a compatibility catalyst is 10, whereas the highest acid value at which useful nitrocellulose compatible resins have been obtained is 50.

Referring again to Figure 1, the area ABC represents the acid value compatibility band which obtains when a resin-grade pentaerythritol is employed and no catalyst is added, whereas the area XYZ represents the acid value compatibility band which obtains when calcium acetate is added as catalyst, see Examples 1–3, inclusive.

Pentaerythritol is made commercially by the condensation of acetaldehyde and formaldehyde.

Along with the pentaerythritol monomer formed, there are formed comparatively small amounts of related hydroxylated substances. One of these compounds, dipentaerythritol, is an ether having the following structure:

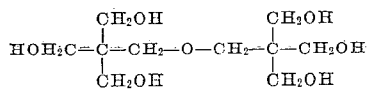

Another related compound, tripentaerythritol, is formed in even smaller amounts. According to the best evidence it is believed to have the following structural formula:

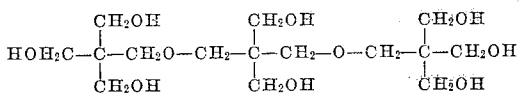

Dipentaerythritol, tripentaerythritol and higher ethers of pentaerythritol may be grouped together under the generic term "polypentaerythritol." This term is employed herein to mean those compounds having higher molecular weights than pentaerythritol monomer which are formed actually or theoretically by etherifying one or more of the hydroxy groups of pentaerythritol monomer with other pentaerythritol molecules. The monomer, dimer, trimer, etc. of pentaerythritol refer to simple pentaerythritol, dipentaerythritol and tripentaerythritol, respectively. The term "pentaerythritol" as used herein is used in a generic sense to include pentaerythritol monomer, polypentaerythritols and pentaerythritol monomer - polypentaerythritol mixtures.

In accordance with this invention, the pentaerythritol employed in making the desired resins may be pentaerythritol monomer, dipentaerythritol, tripentaerythritol, mixtures of polypentaerythritols, or pentaerythritol monomer-polypentaerythritol mixtures. Preferably, the pentaerythritol employed will contain from 70 to 90% pentaerythritol monomer and will have a hydroxyl content of at least 42%.

To determine the proper proportions of rosin acid material and a particular pentaerythritol to employ, it is desirable to first determine the hydroxyl content of the pentaerythritol by the acetylation method. The combining or equivalent weight of the pentaerythritol, i. e., that amount theoretically needed to completely esterify 1 mol of rosin acid (302 parts) is given by the following formula:

Combining weight =

$$\frac{17 \times 100}{\text{Per cent hydroxyl content of pentaerythritol}}$$

The amount of pentaerythritol required for 1 mol of rosin acid to provide the desired number of pentaerythritol hydroxyl groups per rosin acid carboxyl group can be obtained by multiplying the combining weight of the pentaerythritol by the desired number.

Having now indicated in a general way the nature and purpose of this invention, there follows a more detailed description of specific embodiments of the invention.

*Example 1*

| | Parts |
|---|---|
| N wood rosin | 1006 |
| Pentaerythritol | 150 |
| Calcium acetate·H2O | 3.0 |

The wood rosin employed contained 10% neutral bodies. Hence, the rosin acid content amounted to 906 parts or 3 mols. The pentaerythritol was a technical grade material containing about 83% pentaerythritol monomer and having a hydroxyl content of about 46.0%. The combining weight of the pentaerythritol was 37, and there were accordingly present 1.35 pentaerythritol hydroxyls for each rosin acid carboxyl group.

The pentaerythritol employed contained a small amount of sodium as an impurity. The sodium was actually present in the pentaerythritol as the formate and the carbonate. However, in determining the amount quantitatively, it was converted to sodium sulfate, and the sodium sulfate obtained amounted to 0.27%. Hence, there was present in the pentaerythritol 0.0057 equivalent of sodium or 0.0019 equivalent per mol of rosin acid. The calcium acetate added provided in addition 0.0110 equivalent of calcium per mol of rosin acid.

The rosin was heated to 200° C. at which point the pentaerythritol and calcium acetate were added with mechanical agitation. The mass was heated to 280° C. over a period of 30 minutes and held there for 1 hour with continued agitation. Mechanical agitation was then discontinued and a gentle stream of $CO_2$ was passed through the mass while maintaining a temperature of 280° C. Samples were taken at intervals as esterification progressed. It was found that the ester samples having acid values of from 26 to 34.5 (determined using phenolphthalein indicator on the esters after they had cooled to room temperature) were compatible with ½ sec. R. S. nitrocellulose at ester to nitrocellulose ratios of from 1.5–1.0 to 4.0–1.0, see area XYZ of Figure 1. Esters having an acid value above 34.5 were found to give seedy films with nitrocellulose whereas esters having an acid value below 26 were found to give hazy films with nitrocellulose.

Duplicating the example leaving out the calcium acetate, it was found that nitrocellulose compatible esters were achieved only in the acid value range of 30–34. Removal of the sodium from the pentaerythritol prior to esterification did not affect this compatibility range.

*Example 2*

| | Parts |
|---|---|
| N wood rosin | 1006 |
| Pentaerythritol | 160 |
| Calcium acetate·H2O | 3.0 |

The same types of rosin and pentaerythritol were employed as in Example 1. In this instance, there were present, however, 1.44 pentaerythritol hydroxyls for each rosin acid carboxyl group. There was present in the pentaerythritol 0.0061 equivalent of sodium or 0.0020 equivalent of sodium per mol of rosin acid. The calcium acetate added provided in addition 0.0110 equivalent of calcium per mol of rosin acid.

The method employed in esterifying the ingredients was identical with that of Example 1. It was found that the ester samples having acid values of from 16 to 30 were compatible with ½ sec. R. S. nitrocellulose at ester to nitrocellulose ratios of from 1.5–1.0 to 4.0–1.0. Esters having an acid value above 30 were found to give seedy films with nitrocellulose whereas esters having an acid value below 16 were found to give hazy films with nitrocellulose.

Duplicating the example leaving out the calcium acetate, it was found that nitrocellulose compatible esters were achieved only in the acid value range of 24–32.

Example 3

| | Parts |
|---|---|
| N wood rosin | 1006 |
| Pentaerythritol | 140 |
| Calcium acetate·H₂O | 3.0 |

The same types of rosin and pentaerythritol were employed as in Example 1. In this instance, there were present, however, 1.26 pentaerythritol hydroxyls for each rosin acid carboxyl group. There was present in the pentaerythritol 0.0053 equivalent of sodium or 0.0018 equivalent of sodium per mol of rosin acid. The calcium acetate added provided in addition 0.0110 equivalent of calcium per mol of rosin acid.

The method employed in esterifying the ingredients was identical with that of Example 1. It was found that ester samples having acid values of from about 36 to 39 were compatible with ½ sec. R. S. nitrocellulose at ester to nitrocellulose ratios of from 1.5–1.0 to 4.0–1.0. Esters having an acid value above 39 were found to give seedy films with nitrocellulose whereas esters having an acid value below 36 were found to give hazy films with nitrocelluose. Duplication of the example leaving out the calcium acetate showed that there was no acid value range in which true nitrocellulose compatibility could be obtained. Borderline compatibility was obtained at an acid value of about 36.

Example 4

Example 2 was duplicated only 3.0 parts of zinc oxide was substituted for the calcium acetate. The zinc oxide provided 0.0740 equivalent of zinc, or 0.0246 equivalent of zinc per mol of rosin acid. Check samples removed from this resin during esterification showed that at acid values from 18.5 to 34 truly nitrocellulose compatible resins were obtained. These esters were entirely compatible with ½ sec. R. S. nitrocellulose at ester to nitrocellulose ratios of from 1.5–1.0 to 4.0–1.0.

Example 5

| | Parts |
|---|---|
| N wood rosin | 1006 |
| Pentaerythritol | 150 |
| Sodium formate | 1.15 |

The same types of rosin acid and pentaerythritol were employed as in Example 1. The sodium formate added provided 0.0056 equivalent of sodium per mol of rosin acid. Employing the procedure of Example 1, it was found that esters having acid values of from 25 to 34 were compatible with ½ sec. R. S. nitrocellulose at ester to nitrocellulose ratios of from 1.5–1.0 to 4.0–1.0.

Example 6

| | Parts |
|---|---|
| N wood rosin | 1006 |
| Pentaerythritol | 150 |
| Lithium carbonate | 1.26 |

The same types of rosin and pentaerythritol were employed as in Example 1. The lithium carbonate added provided 0.0112 equivalent of lithium per mol of rosin acid. Employing the procedure of Example 1 it was found that esters having acid values of from 23–38 were compatible with ½ sec. R. S. nitrocellulose at ester to nitrocellulose ratios of from 1.5–1.0 to 4.0–1.0.

Example 7

| | Parts |
|---|---|
| N wood rosin | 1006 |
| Pentaerythritol | 150 |
| Potassium carbonate | 2.35 |

The same types of rosin acid and pentaerythritol were employed as in Example 1. The potassium carbonate added provided 0.0112 equivalent of potassium per mol of rosin acid. Employing the procedure of Example 1, it was found that esters having acid values of from 20 to 29 were compatible with ½ sec. R. S. nitrocellulose at ester to nitrocellulose ratios of from 1.5–1.0 to 4.0–1.0.

Example 8

| | Parts |
|---|---|
| N wood rosin | 1006 |
| Pentaerythritol | 150 |
| Calcium oxide | 0.48 |

The same types of rosin acid and pentaerythritol were employed as in Example 1. The calcium oxide added provided 0.0056 equivalent of calcium per mol of rosin acid. Employing the procedure of Example 1, it was found that esters having acid values of from 18 to 31 were compatible with ½ sec. R. S. nitrocellulose at ester to nitrocellulose ratios of from 1.5–1.0 to 4.0–1.0.

Example 9

| | Parts |
|---|---|
| N wood rosin | 1006 |
| Pentaerythritol | 150 |
| Barium hydroxide | 3.2 |

The same types of rosin acid and pentaerythritol were employed as in Example 1. The barium hydroxide added provided 0.0124 equivalent of barium per mol of rosin acid. Employing the procedure of Example 1, it was found that esters having acid values of from 19 to 29 were compatible with ½ sec. R. S. nitrocellulose at ester to nitrocellulose ratios of from 1.5–1.0 to 4.0–1.0.

Example 10

| | Parts |
|---|---|
| N wood rosin | 1006 |
| Pentaerythritol | 150 |
| Strontium acetate | 3.65 |

The same types of rosin acid and pentaerythritol were employed as in Example 1. The strontium acetate added provided 0.0118 equivalent of strontium per mol of rosin acid. Employing the procedure of Example 1, it was found that esters having acid values of from 27 to 37 were compatible with ½ sec. R. S. nitrocellulose at ester to nitrocellulose ratios of from 1.5–1.0 to 4.0–1.0.

Example 11

| | Parts |
|---|---|
| N wood rosin | 1006 |
| Pentaerythritol | 150 |
| Cadmium oxide | 0.55 |

The same types of rosin acid and pentaerythritol were employed as in Example 1. The cadmium oxide added provided 0.0028 equivalent of cadmium per mol of rosin acid. Employing the procedure of Example 1, it was found that esters having acid values of from 20 to 37 were compatible with ½ sec. R. S. nitrocellulose at ester to nitrocellulose ratios of from 1.5–1.0 to 4.0–1.0.

Example 12

| | Parts |
|---|---|
| N wood rosin | 1006 |
| Pentaerythritol | 150 |
| Magnesium oxide | 0.17 |

The same types of rosin acid and pentaerythritol were employed as in Example 1. The magnesium oxide added provided 0.0028 equivalent of magnesium per mol of rosin acid. Employing the procedure of Example 1, it was found that esters having acid values of from 27 to 35 were compatible with ½ sec. R. S. nitrocellulose at ester to nitrocellulose ratios of from 1.5–1.0 to 4.0–1.0.

*Example 13*

| | Parts |
|---|---|
| N wood rosin | 1006 |
| Pentaerythritol | 150 |
| Zinc acetate | 8.1 |

The same types of rosin acid and pentaerythritol were employed as in Example 1. The zinc acetate added provided 0.0290 equivalent of zinc per mol of rosin acid. Employing the procedure of Example 1, it was found that esters having acid values of from 18 to 36 were compatible with ½ sec. R. S. nitrocellulose at ester to nitrocellulose ratios of from 1.5–1.0 to 4.0–1.0.

*Example 14*

| | Parts |
|---|---|
| N wood rosin | 1006 |
| Pentaerythritol | 150 |
| Calcium acetate·$H_2O$ | 3.0 |

The rosin employed was the same as that of Example 1. The pentaerythritol was explosives grade (substantially entirely pentaerythritol monomer), having a hydroxyl content of 48.8. The combining weight of the pentaerythritol was 34.9, and there were accordingly present 1.44 pentaerythritol hydroxyls for each rosin acid carboxyl group. This pentaerythritol was substantially free of metal compounds. The calcium acetate added provided 0.0110 equivalent of calcium per mol of rosin acid. Esterification was carried out in accordance with the procedure of Example 1, and it was found that esters having acid values from 17 to 34 evidenced nitrocellulose compatibility at ester to nitrocellulose ratios of from 1.5–1.0 to 4.0–1.0.

*Example 15*

| | Parts |
|---|---|
| N wood rosin | 1006 |
| Dipentaerythritol | 182 |
| Calcium acetate·$H_2O$ | 3.0 |

The rosin employed was the same as that of Example 1. The dipentaerythritol had a hydroxyl content of 40.2, hence a combining weight of 42.1. There were accordingly present 1.44 pentaerythritol hydroxyls for each rosin acid carboxyl group. The dipentaerythritol was substantially free of metal compounds. The calcium acetate added provided 0.0110 equivalent of calcium per mol of rosin acid. Esterification was carried out in accordance with the procedure of Example 1, and it was found that esters having acid values from 16 to 25 evidence nitrocellulose compatibility at ester to nitrocellulose ratios of from 1.5–1.0 to 4.0–1.0.

Any rosin acid may be used in preparing the subject resinous esters. By the term "rosin acid material," there is meant not only the substantially pure rosin acids but also commercial wood and gum rosins from which the substantially pure rosin acids are obtainable. Commercial wood rosin usually contains about 10% of a non-acidic fraction known as neutral bodies. Commercial gum rosin also contains neutral bodies but usually in a somewhat lesser amount as compared with wood rosin. The term "rosin acid material" as used herein accordingly comprises substantially pure rosin acids and specific rosin acids obtainable therefrom as abietic, l-pimaric, d-pimaric, sapinic, etc. acids. The term also includes such substantially pure rosin acids, wood rosin or gum rosins which have been subjected to further treatment such as hydrogenation, dehydrogenation, disproportionation or heat-treatment. Of these various materials, wood or gum rosin is preferred since its use is economically advantageous and from the standpoint of producing a nitrocellulose compatible product is as effective as the others.

As indicated by the examples, any pentaerythritol may be employed in carrying out this invention, the examples having specifically illustrated the use of pentaerythritol monomer, dipentaerythritol and technical pentaerythritol monomer-polypentaerythritol mixtures. However, the preferred type of pentaerythritol employed as a starting material is one containing from 70 to 90% pentaerythritol monomer and having a hydroxyl content of at least 42%. Included within this preferred classification are the so-called technical or resin grade pentaerythritols available commercially.

The compatibility catalysts employed in accordance with the invention have been well illustrated by the examples. In general, the effective catalysts are compounds of metals of groups IA, IIA and IIB of the periodic table, which metals have atomic weights below 140. Lead and cobalt compounds are also effective. It has been found that the metal compounds which are effective are those which in aqueous solution give an alkaline or basic reaction. Thus, the formates, acetates, carbonates, bicarbonates, oxides, hydroxides, etc. are all effective. The most effective, and hence the preferred, compounds are those most readily soluble in rosin acids, these being the formates and the acetates. Salts whose aqueous solutions are neutral or acid, for example calcium sulfate, have a deleterious effect on nitrocellulose compatibility. Highly acidic compounds are of no value since they decarboxylate the rosin acid.

In order to achieve a broadening of the acid value compatibility band or an extension of the acid value compatibility range, as the case may be, it is necessary to employ an effective amount of the catalyst. The minimum amount of catalyst required varies somewhat with the catalyst employed. However, in general, it has been found that at least 0.0040 chemical equivalent of metal per mol of rosin acid is required to achieve this effect. Furthermore, about 0.400 chemical equivalent of metal per mol of rosin acid appears to be the point at which maximum broadening of the compatibility band is achieved. Although higher catalyst concentration can be employed, there is no added advantage accruing. The preferred range of catalyst concentration is from .010 to 0.400 chemical equivalent of metal per mol of rosin acid. It will be understood that several metal compounds may be employed together as the catalyst, as in Example 1. In this case, the pentaerythritol used had a small amount of sodium as an impurity, and the sodium was present in an effective form for catalysis, although not per se in an effective amount.

The general method of esterification used in applying the principles of this invention is that known to the art for esterifying pentaerythritol and a rosin acid material. Thus, an esterification temperature of at least 250° C. should be used, and preferably a temperature of from 260° C. to 280° C. It is furthermore preferred, although not required, to heat the rosin acid material to a temperature of 190° C. to 210° C. prior to adding the pentaerythritol and then to raise the temperature of the ingredients to the desired esterification temperature as fast as possible. During esterification a gentle stream of inert gas such as $CO_2$, $N_2$, etc. may be passed through the reaction mixture. Heating is discontinued at a point such that the product after cooling to room temperature has an acid value (using phenolphthalein indicator) in the acid value compatibility range which applies for the particular ratio of pentaerythritol hydroxyl to rosin acid carboxyl groups employed. During the period of cooling of the ester from the esterification temperature to room temperature the acid value may drop by as much as 10 points and the extent of this drop in acid value is dependent upon the conditions under which the cooling is effected.

During the esterification reaction some pentaerythritol and rosin acid material may be lost by distillation. Although these losses are slight, it is important to keep them at a very minimum. If the proportion of reactants originally employed is not maintained, it is obvious that the acid value compatibility range cannot be predicted. To prevent such losses of ingredients or to keep such losses to a minimum, it is best not to sparge the resins during preparation. However, as illustrated by the examples, the use of a gentle stream of inert gas such as $N_2$, $CO_2$, etc. to agitate the ingredients may be advantageously employed. Losses of ingredients can also be minimized by maintaining considerable free space between the top of the reaction vessel and the surface of the reaction mixture or by employing a suitable condenser. In this manner, water of esterification can be removed while retaining substantially all the reactants.

The resinous esters prepared in accordance with this invention are truly compatible with nitrocellulose in the ester to nitrocellulose ratios of from 1.5–1.0 to 4.0–1.0. Lacquers comprising the ingredients in these proportions deposit films which are perfectly clear and do not exhibit seediness, graininess or haziness. Generally speaking, the lacquers themselves are also perfectly clear. In some cases, a slight cloudiness or haziness can be detected in the lacquer. Even in these cases, however, the resulting films evidence complete compatibility of the esters and the nitrocellulose. Although in the examples the resins were tested for compatibility using ½ sec. R. S. nitrocellulose, the compatibility of the resins of this invention is not limited to compatibility with this particular type of nitrocellulose. The resins are compatible with the various types and grades of nitrocellulose used commercially in nitrocellulose formulations. The resins are also compatible with N-type ethyl cellulose.

Where in the specification and claims reference is made to pentaerythritol monomer content of a pentaerythritol, it will be understood that determination by the dibenzal method is meant. This method involves the following steps. Prepare a benzaldehyde-methanol reagent by adding 100 ml. of anhydrous methanol to 20 ml. of benzaldehyde. Add 5 ml. of water to a dry sample of the pentaerythritol (0.35–0.55 gram) contained in an Erlenmeyer flask. Heat the 5 ml. solution to boiling, add 15 ml. of the benzaldehyde-methanol reagent and mix these solutions well. Add 12 ml. concentrated HCl and shake the reaction mixture. Allow the reaction mixture to stand for 5 minutes with occasional swirling while the greater part of the precipitate of pentaerythritol dibenzal forms and then place the flask in an ice bath for 1 hour. Dilute the reaction mixture with 25 ml. of ice cold methanol-water solution (1:1 by volume) and filter through a weighed fritted glass crucible. Wash the precipitate free of benzaldehyde with 100 ml. of methanol-water solution (1:1 by volume) at a temperature of 20–25° C. Dry the precipitate to constant weight at 120° C. (about 2 hours). The pentaerythritol monomer is calculated using the following formula in which 0.0269 represents a correction value for the solubility of the pentaerythritol dibenzal:

$$\frac{(\text{Grams precipitate}+0.0269)43.60}{\text{Grams sample}}=$$

Per cent pentaerythritol monomer

Where in the specification and claims reference is made to acid value, it will be understood that the phenolphthalein method for determining acid value is meant. This method involves the following steps. Dissolve about 3 grams of the resin in 15 ml. of toluene. Add 50 ml. of a neutral alcohol-benzene solution (1:1 by volume) and titrate the resulting solution with 0.5 N NaOH or KOH using phenolphthalein indicator to a permanent endpoint.

Where in the specification and claims reference is made to the hydroxyl value of a pentaerythritol, it will be understood that determination by the acetylation method is meant. This method involves the following steps. Prepare an acetic anhydride-pyridine solution by adding exactly 3.5 ml. water to 1000 ml. dry pyridine. After mixing, add 140 ml. acetic anhydride to make the reagent approximately 2.4 N. Weigh 0.5 to 0.6 gram of dry pentaerythritol into a 250 ml. Erlenmeyer flask. Add 25 ml. of the pyridine-acetic anhydride reagent from a constant delivery pipette. Attach the flask to a condenser and reflux gently for 30 minutes. Flush the condensers with 30–50 ml. of water, cool the flask for 20 min. in tap water to below 20° C. and titrate at once with 1.0 N NaOH using phenolphthalein indicator. Add the NaOH slowly (about 15–20 ml. per minute) until within 10 ml. of the endpoint and from then on add the NaOH dropwise. Determine the concentration of the pyridine-acetic anhydride reagent by making a blank determination on 25 ml. under the above conditions. The hydroxyl content is calculated using the following formula wherein A is the ml. NaOH used to titrate the blank, B is the ml. NaOH used to titrate the sample and N. F. is the normality factor of the NaOH:

$$\frac{1.7\ (A-B)\ \text{N.F.}}{\text{Grams sample}}=\text{Per cent hydroxyl}$$

All parts and percentages in the specification and claims are by weight unless otherwise mentioned.

What I claim and desire to protect by Letters Patent is:

1. In the process of preparing a hard nitrocellulose compatible resin which comprises reacting a rosin acid material and a pentaerythritol, in sufficient amount to provide from 1.26 to 1.44 hydroxyl groups for each rosin acid carboxyl group, under esterifying conditions, until a resin having an acid value within the acid value band productive of nitrocellulose compatibility and defined by the area ABC of Figure 1 is obtained, the improvement which comprises carrying out the reaction in the presence of a compatibility catalyst whereby a substantial broadening of the aforesaid acid value band productive of nitrocellulose compatibility is obtained within the limits of 50 maximum acid value and 10 minimum acid value, said compatibility catalyst being selected from compounds having an atomic weight less than 140 of the class consisting of group IA, group IIA, and group IIB of the periodic table, which compounds are alkaline reacting in aqueous solution.

2. The process of claim 1 wherein the compatibility catalyst is present in such an amount to provide at least 0.0040 chemical equivalent of metal per mol of rosin acid.

3. The process of claim 2 wherein the pentaerythritol is a pentaerythritol monomer-polypentaerythritol mixture containing from 70 to 90% pentaerythritol monomer and having an hydroxyl content of at least 42%.

4. The process of claim 3 wherein a compound of a metal of group IA is employed as catalyst.

5. The process of claim 4 wherein a compound of sodium is employed as catalyst.

6. The process of claim 5 wherein rosin is employed and wherein the sodium compound is employed in such an amount as to provide from 0.0040 to 0.400 chemical equivalent of metal per mol of rosin acid.

7. The process of claim 4 wherein a compound of potassium is employed as catalyst.

8. The process of claim 7 wherein rosin is employed and wherein the potassium compound is employed in such an amount as to provide from 0.0040 to 0.400 chemical equivalent of metal per mol of rosin acid.

9. The process of claim 3 wherein a compound of a metal of group IIA is employed as catalyst.

10. The process of claim 9 wherein a compound of calcium is employed as catalyst.

11. The process of claim 10 wherein rosin is employed and wherein the calcium compound is employed in such an amount as to provide from 0.0040 to 0.400 chemical equivalent of metal per mol of rosin acid.

12. The process of claim 1 wherein the compatibility catalyst is employed in such an amount as to provide from 0.0040 to 0.400 chemical equivalent of metal per mol of rosin acid.

13. The process of claim 2 wherein rosin is employed.

ALFRED E. RHEINECK.

No references cited.